United States Patent [19]
Rozak et al.

[11] Patent Number: 5,761,641
[45] Date of Patent: Jun. 2, 1998

[54] METHOD AND SYSTEM FOR CREATING VOICE COMMANDS FOR INSERTING PREVIOUSLY ENTERED INFORMATION

[75] Inventors: Michael J. Rozak, Issaquah; James H. Spoltman, Snohomish, both of Wash.

[73] Assignee: Microsoft Corporation, Redmond, Wash.

[21] Appl. No.: 509,414

[22] Filed: Jul. 31, 1995

[51] Int. Cl.⁶ .................................................. G10L 9/00
[52] U.S. Cl. ................................. 704/275; 704/270
[58] Field of Search ........................ 395/2.84, 2.6, 395/2.79

[56] References Cited

U.S. PATENT DOCUMENTS

| | | | |
|---|---|---|---|
| 4,509,133 | 4/1985 | Monbaron et al. | 364/513 |
| 4,677,569 | 6/1987 | Nakano et al. | 364/513 |
| 4,704,696 | 11/1987 | Reimer et al. | 364/513 |
| 4,766,529 | 8/1988 | Nakano et al. | 364/513 |
| 4,776,016 | 10/1988 | Hansen | 381/42 |
| 4,783,803 | 11/1988 | Baker et al. | 381/42 |
| 4,827,520 | 5/1989 | Zeinstra | 381/43 |
| 4,864,623 | 9/1989 | Van Nes et al. | 381/43 |
| 4,866,778 | 9/1989 | Baker | 381/43 |
| 4,903,012 | 2/1990 | Ohuchi | 340/709 |
| 4,931,950 | 6/1990 | Isle et al. | 364/513 |
| 4,987,411 | 1/1991 | Ishigami | 340/709 |
| 5,027,406 | 6/1991 | Roberts et al. | 381/43 |
| 5,075,675 | 12/1991 | Baker et al. | 340/721 |
| 5,157,384 | 10/1992 | Greanias et al. | 340/706 |
| 5,231,670 | 7/1993 | Goldhor et al. | 704/200 |
| 5,231,691 | 7/1993 | Yasuda | 395/2 |
| 5,255,341 | 10/1993 | Nakajima | 704/200 |
| 5,265,202 | 11/1993 | Krueger et al. | 395/158 |
| 5,357,596 | 10/1994 | Takebayashi et al. | 704/775 |
| 5,377,303 | 12/1994 | Firman | 704/275 |
| 5,384,910 | 1/1995 | Torres | 395/156 |
| 5,386,494 | 1/1995 | White | 704/275 |
| 5,404,458 | 4/1995 | Zetts | 704/266 |
| 5,408,582 | 4/1995 | Colier | 704/243 |
| 5,425,141 | 6/1995 | Gedye | 395/157 |
| 5,444,617 | 8/1995 | Merialdo | 364/419.1 |
| 5,448,695 | 9/1995 | Douglas et al. | 395/155 |
| 5,465,378 | 11/1995 | Duensing et al. | 395/800 |
| 5,519,809 | 5/1996 | Husseiny et al. | 704/275 |
| 5,524,051 | 6/1996 | Ryan | 380/9 |
| 5,566,248 | 10/1996 | Ulrich | 382/187 |
| 5,590,264 | 12/1996 | Keane et al. | 395/340 |
| 5,602,963 | 2/1997 | Bissonnette et al. | 704/275 |
| 5,602,981 | 2/1997 | Hargrove | 395/352 |
| 5,617,526 | 4/1997 | Oran et al. | 395/326 |

OTHER PUBLICATIONS

*Microsoft® Word User's Guide*, Version 6.0, pp. 72–73, 1993–1994.
Schmandt, Chris et al., "Augmenting a Window System with Speech Input," *Computer*, vol. 23(8), pp. 50–56, Aug., 1990.
Borgen et al., *Voice Navigator™ Owner's Guide*, Articulate Systems, Inc., pp. 4, 11, 12, 25–27, 43, and 44, 1990.
Software User's Guide –Microsoft® Windows™ Sound System, Version 2.0, part 2, pp. 28–56, part 3, pp. 59–70, 1993.
"Integrated Audio–Graphics User Interface," IBM Technical Disclosure Bulletin, vol. 33(11), pp. 368–371, Apr., 1991.
Kurzweil, "Kurzweil Brings Voice Dictation to Windows," *BYTE*, vol. 19(8):48, Aug., 1994.
Meisel, William S., "Talk to Your Computer," *BYTE*, vol. 18(11): 113, Oct., 1993.

*Primary Examiner*—David R. Hudspeth
*Assistant Examiner*—Susan Wieland
*Attorney, Agent, or Firm*—Seed and Berry LLP

[57] ABSTRACT

A method and system for creating voice commands for inserting previously entered information is provided. In a preferred embodiment, a command to create a new voice command is received after a user has selected information to be inserted by the new voice command. In response, the selected information is retrieved and a new voice command name is received from the user. A new voice command is then created that, when invoked by speaking the new voice command name while a document is being edited, inserts the selected information into the document being edited.

24 Claims, 10 Drawing Sheets

METHOD AND SYSTEM FOR CREATING VOICE COMMANDS FOR INSERTING PREVIOUSLY ENTERED INFORMATION

TECHNICAL FIELD

The invention relates generally to the field of voice-controlled computers, and, more specifically, to the field of voice command generation.

BACKGROUND OF THE INVENTION

A document is a related collection of information typically generated by a human user using an application program ("application"). A document may be stored in a file, and thereby be maintained persistently. For example, a user may use a word processing application to generate a word processing document. The word processing document may contain such information as text, tables, graphs, pictures, and equations. In order to insert a block of text in the word processing document, the user generally uses a keyboard to type the contents of the block of text. In order to insert other types of information, the user typically uses a specialized software tool, such as a drawing tool to generate and insert pictures and an equation tool to generate and insert equations.

Users typically insert certain pieces of information into documents on a regular basis. For example, a user who authors advertising copy may commonly insert a sentence such as the following in documents that he or she generates:

All products or services mentioned are trademarks, service marks, registered trademarks, or registered service marks of their respective owners.

The user would typically be required to type such a sentence each time the user inserted it in a document.

Because manually inserting commonly inserted pieces of information involves significant redundant user activity as demonstrated above, it would be preferable to provide a convenient way to provide for later efficient reinsertion of a previously entered piece of information.

SUMMARY OF THE INVENTION

The present invention provides a method and system for creating voice commands that each insert previously entered information in response to recognizing spoken input as a name associated with the voice command. In a preferred embodiment, the user selects the information to be inserted by the new voice command. The user then speaks a special voice command, "create voice command from selection." In response, a voice command creation facility ("the facility") displays the selected information and prompts the user for a command name for the new voice command. The facility then creates a voice command having the command name provided by the user that causes the selected information to be inserted. When the user subsequently speaks the name of the new voice command while editing a document, the facility inserts the selected information in the document.

DETAILED DESCRIPTION OF THE INVENTION

The present invention provides a method and system for creating voice commands that each insert previously entered information in response to recognizing spoken input as a name associated with the voice command. The invention is interoperable with a wide range of voice command recognition programs capable of executing commands stored in a voice command table in response to recognizing voice command names received by a voice input device. In a preferred embodiment, the user selects the information to be inserted by the new voice command. The user preferably may select information of virtually any type that may be contained by a document, including text, tables, graphs, pictures, and equations. The user then speaks a special voice command, "create voice command from selection." In response, a voice command creation facility ("the facility") displays the selected information and prompts the user for a command name for the new voice command. The facility then creates a voice command having the command name provided by the user that causes the selected information to be inserted. When the user subsequently speaks the name of the new voice command while editing a document, the facility inserts the selected information in the document. As a result, the user is able to conveniently create a voice command for inserting a previously entered piece of information.

Figure 1:
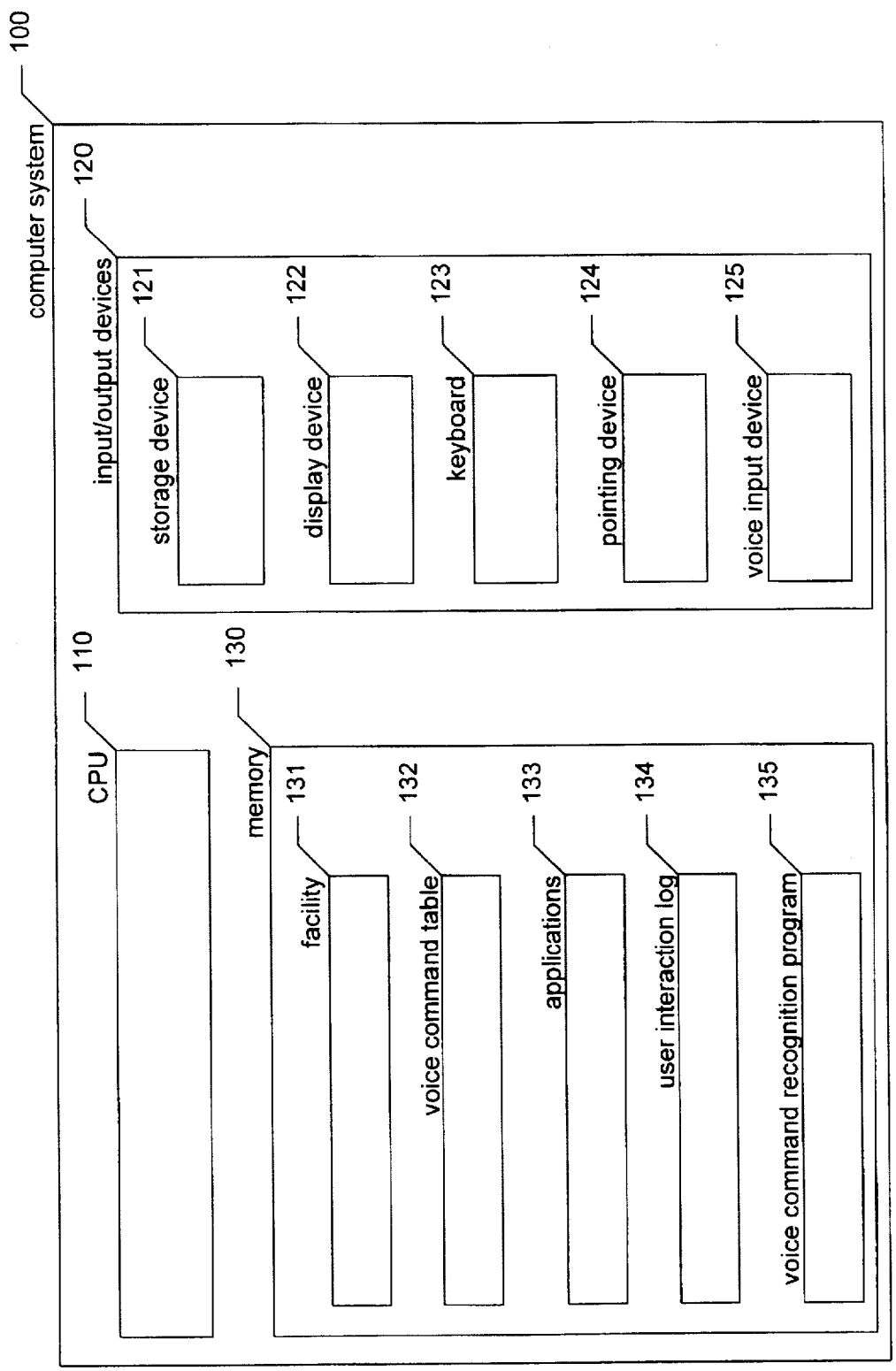
FIG. 1 is a high-level block diagram of the general-purpose computer system upon which the facility preferably operates.

FIG. 1 is a high-level block diagram of the general-purpose computer system upon which the facility preferably operates. The computer system 100 contains a central processing unit (CPU) 110, input/output devices 120, and a computer memory (memory) 130. Among the input/output devices is a storage device 121, such as a hard disk drive; a display device 122, such as a video monitor; a keyboard 123 for inputting text; a pointing device 124, such as a mouse; and a voice input device 125 for receiving audio data for recognition as voice commands, such as a microphone coupled with an audio input interface card containing an analog-to-digital converter for converting an analog audio signal from the microphone to digital form. The computer programs that preferably comprise the facility 131 reside in the memory 130 and execute on the CPU 110. The memory 130 also preferably contains a voice command table 132 containing information about each defined voice command; one or more application programs (applications) 133; and a clipboard 134 for transferring information between applications and other programs. While the facility is preferably implemented on a computer system configured as described above, one skilled in the art will recognize that it may also be implemented on computer systems having different configurations.

Figure 2:
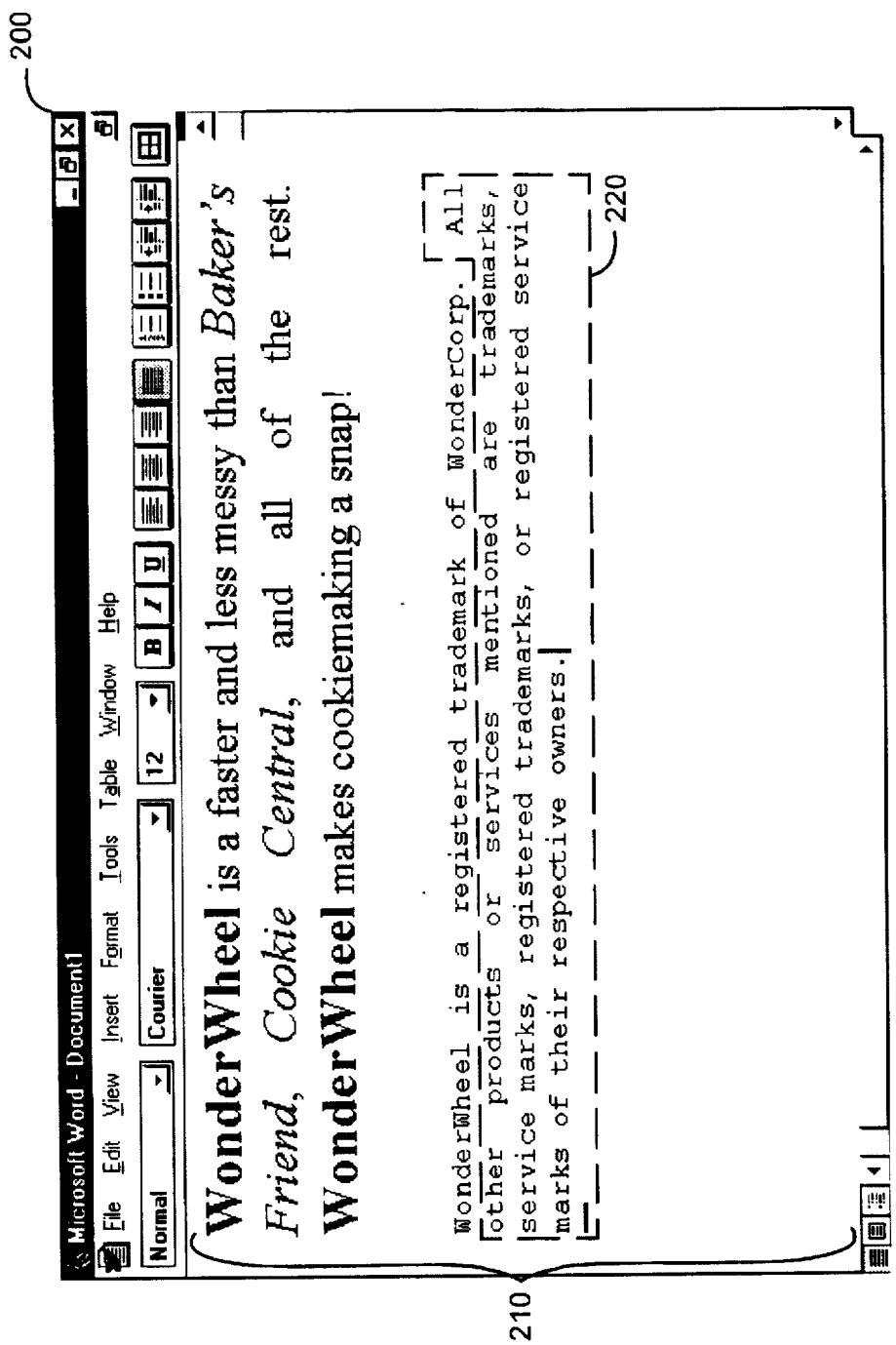
FIG. 2 is a screen diagram showing the user generating a word processing document.

FIGS. 2–8 are screen diagrams illustrating the use of the facility to create a new voice command to insert a commonly-inserted block of text. FIG. 2 is a screen diagram showing the user generating a word processing document. A word processing application among the applications 133 (FIG. 1) displays window 200. Inside the window 200, the word processing application displays the word processing document contents 210. A portion of the word processing document contents 210 is a block of text 220 that the user regularly inserts into word processing documents.

Figure 3:
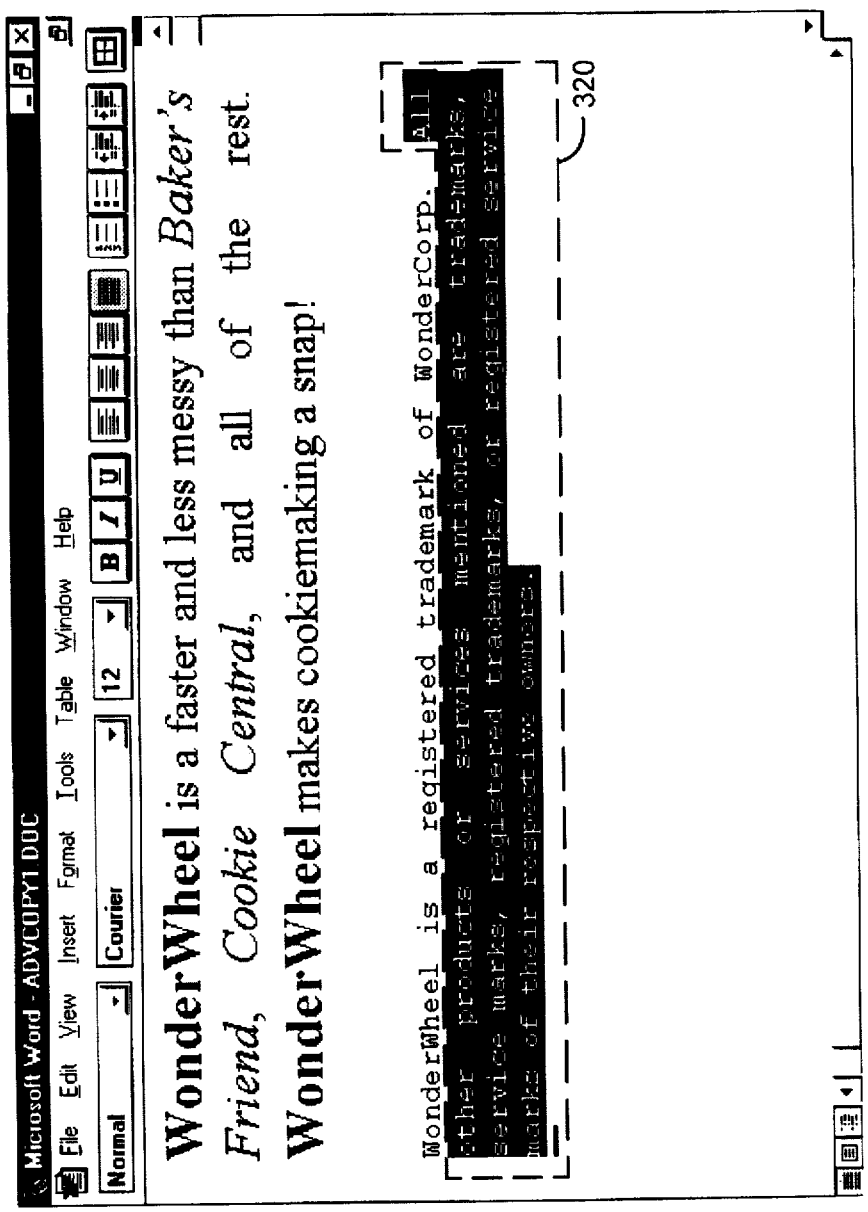
FIG. 3 is a screen diagram showing that the user has selected a block of text.

FIG. 3 is a screen diagram showing that the user has selected the commonly-inserted block of text 320. The user may preferably select a block of text using well-known selection techniques associated with either the pointing device 124 or the keyboard 123.

Figure 4:
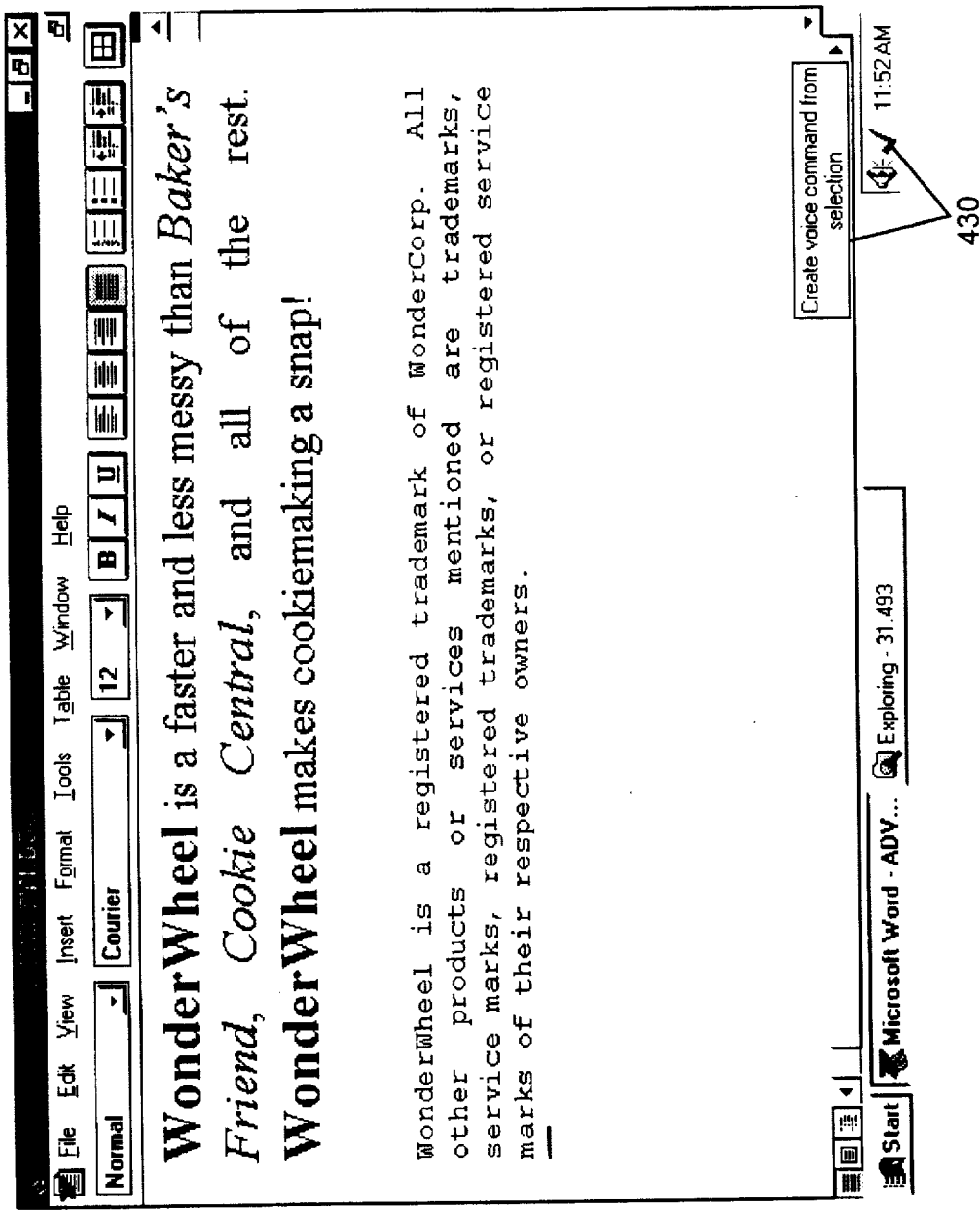
FIG. 4 is a screen diagram showing the invocation of the "create voice command from selection" command.

FIG. 4 is a screen diagram showing the invocation of the "create voice command from selection" command. A legend 430 indicates the invocation of this command. The "check mark" portion of the legend 430 indicates that a voice command was recognized, and the rectangle portion of the legend containing the text "create voice command from selection" indicates that the particular voice command recognized was the "create voice command from selection" voice command. The user preferably invokes the command by speaking the words "create voice command from selection," which are received by the voice input device 125 and recognized by the voice command recognition program 135 as a voice command. The user preferably may also invoke the command using the pointing device 124 or the keyboard 123.

Figure 9:
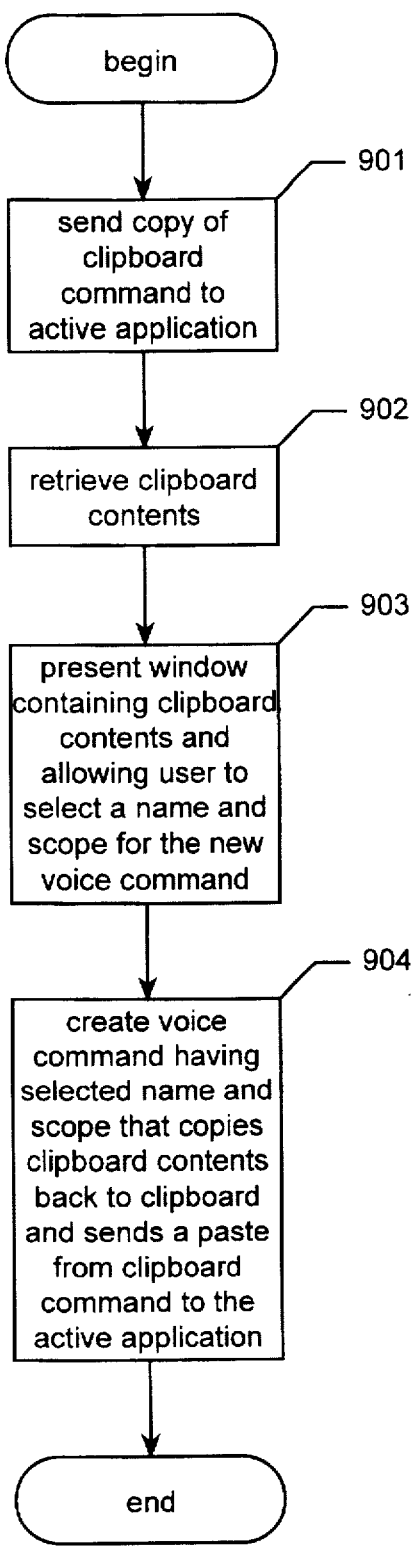
FIG. 9 is a flow diagram showing the steps preferably performed by the facility when the "create voice command from selection" command is invoked.

FIG. 9 is a flow diagram showing the steps preferably performed by the facility when the "create voice command from selection" command is invoked. In step 901, the facility sends a "copy to clipboard" command to the active application, in this case, the word processing application. For many applications, such as those developed for the Microsoft® Windows® 95 operating system, the facility preferably sends a "control-c" keystroke to the application in step 901. In response, the active application stores a copy of the information selected within the application in the clipboard 134 (FIG. 1). The clipboard 134 preferably behaves in the same manner as the clipboard found in the Microsoft® Windows® 95, Microsoft® Windows® NT, and Microsoft® Windows® 3.1 operating systems, described in Petzold, Programming Windows 3.1, Microsoft Press, 1992, pp. 791–822. In step 902, the facility retrieves the contents of the clipboard, thereby receiving a copy of the information selected in the active application. In a preferred embodiment, the facility defers the performance of step 902 until the active application has actually stored a copy of the selected information in the clipboard. In step 903, the facility presents a window containing the information received from the clipboard. The window allows the user to select a name and the context (discussed below) for the new voice command.

Figure 5:
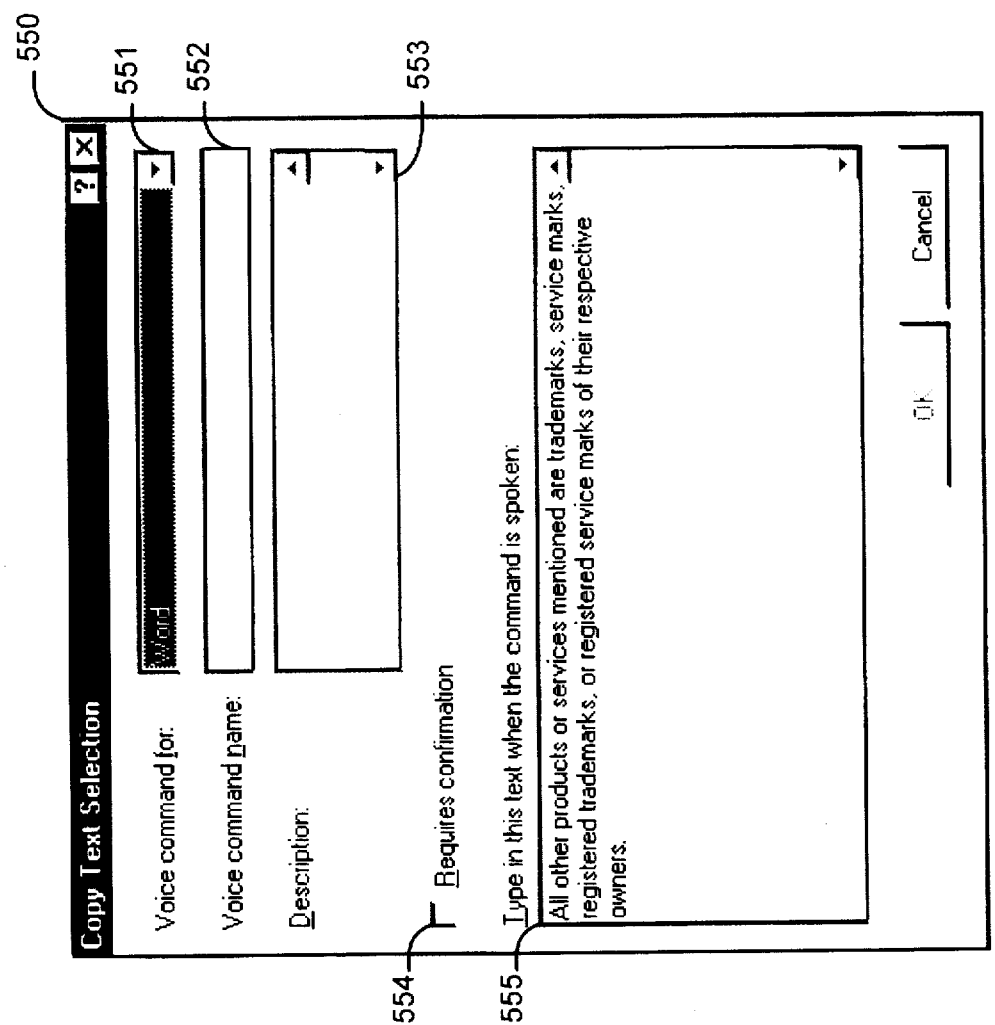
FIG. 5 is a screen diagram showing the window displayed by the facility in response to receiving a "create voice command from selection" command.

FIG. 5 is a screen diagram showing the window displayed in step 903 by the facility in response to receiving a "create voice command from selection" command. The window 550 displays the following pieces of information about the new command: a context field 551, reflecting the context in which the new voice command is available and will be recognized; a name field 552, reflecting the name that the user can speak in order to invoke the new voice commands; a description field 553, optionally containing a description of the new voice command; a confirmation field 554, reflecting whether the new voice command is executed directly upon invocation, or whether the user must confirm the invocation of the voice command before it is executed; and an insertion information field 555, showing the information that will be inserted by the new voice command when it is executed. The screen diagram shows that the facility displays the text block 320 selected in FIG. 3 in the insertion information field 555.

In the context field 551, the user may preferably enter a context corresponding to any available application. Each such context is active when the application to which it corresponds is active. For example, the "Word" context shown corresponds to the word processing application and is active wherever the word processing application is the active application. The user may therefore speak the new voice command while the word processing application is the active application. The user could also enter a context corresponding to a different application, allowing the new voice command to be spoken while that application is the active application. The user may preferably also enter a "global" context that is active any time voice command recognition is enabled.

Figure 6:
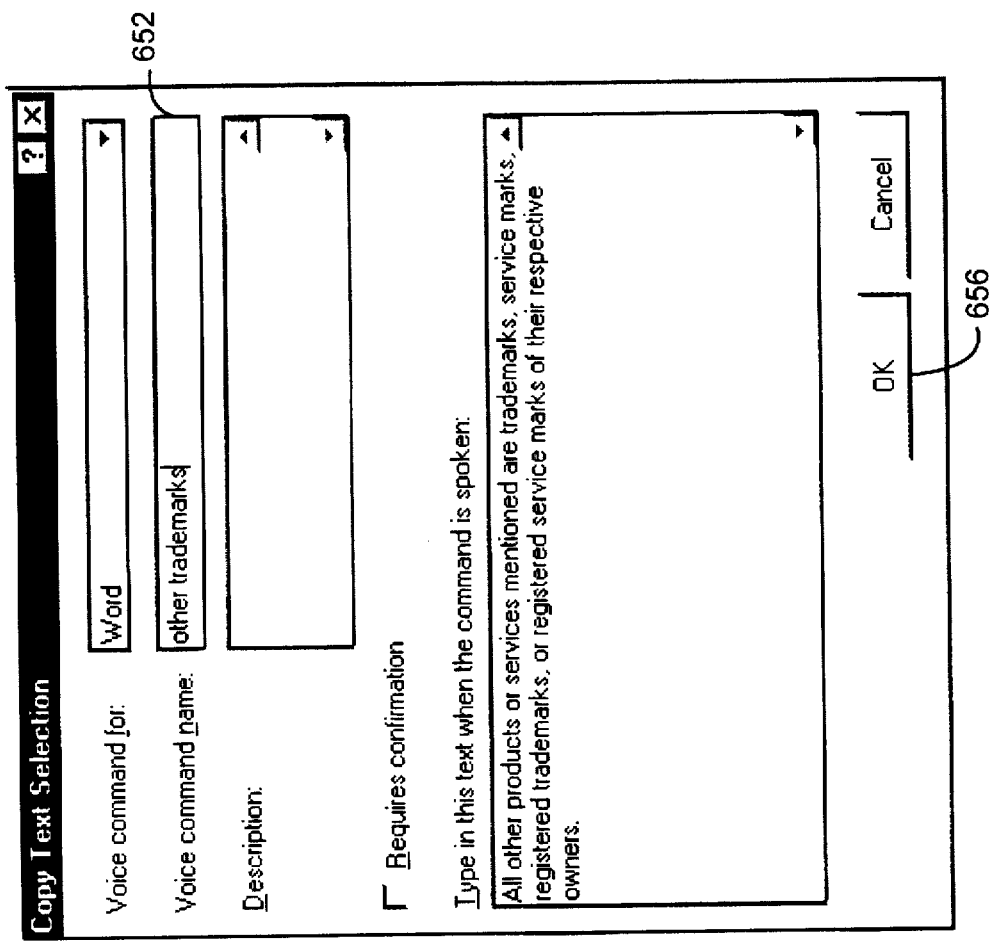
FIG. 6 is a screen diagram showing the user inputting a name for the new voice command.

FIG. 6 is a screen diagram showing the user inputting a name for the new voice command in the name field 652. The user preferably inputs the name for the new voice command using the keyboard 123. After inputting the name for the new voice command, the user preferably presses an OK button 656 to complete the creation of the new voice command.

When the user presses the OK button, the facility continues at step 904 (FIG. 9) to create a new voice command as specified by the user. The new voice command has the command name and scope selected by the user using window 500. The created command specifies copying the information retrieved from the clipboard back to the clipboard, and sending a "paste from clipboard" command to the active application. As a result, the selected information is inserted in the active application. For many applications, such as those developed for the Microsoft® Windows® 95 operating system, the facility preferably sends a "control-v" keystroke to the active application when executing the created command.

Figure 10:
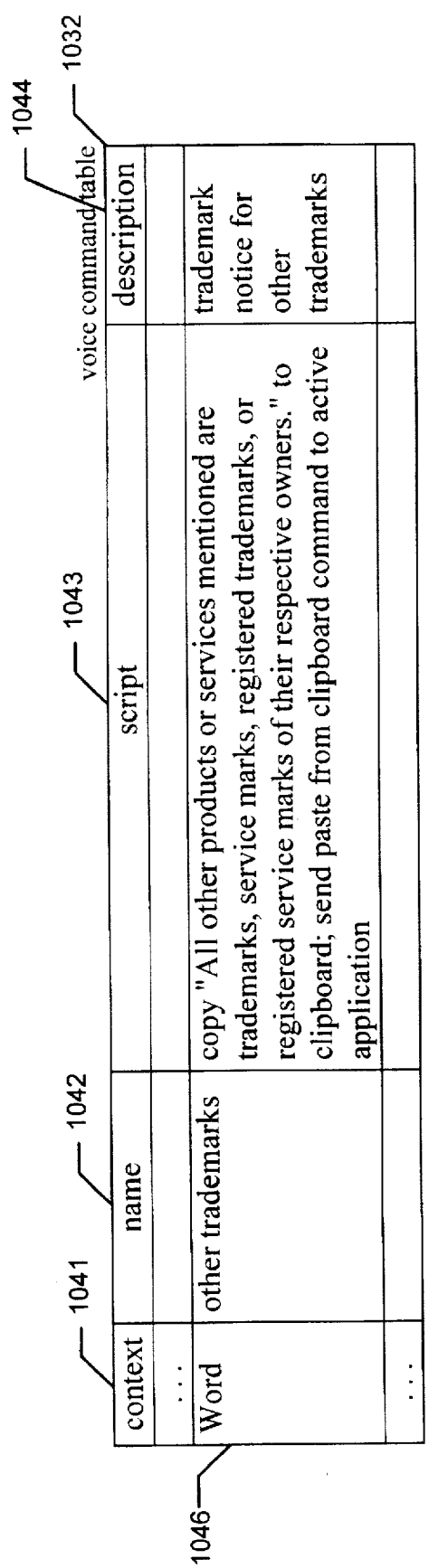
FIG. 10 is a table diagram showing the voice command table containing an entry inserted for the new voice command.

Step 904 is preferably performed by inserting a new voice command in the voice command table 132. FIG. 10 is a table diagram showing the voice command table containing an entry inserted for the new "other trademarks" voice command. The voice command table 1032 (which corresponds to the voice command table 132 shown in FIG. 1) is comprised of the following columns: a context column 1041 containing, for each voice command, the name of the context in which the new voice command is available and will be recognized; a name column 1042 containing the name that the user can speak in order to invoke each voice command; a script column 1043 containing, for each voice command, the steps to execute when the voice command is invoked; and a description column 1044, optionally containing a description of each voice command. The table diagram shows table entry 1046, inserted for the "other trademarks" voice command in step 904. Entry 1046 specifies that the context of the voice command is the word processing application, called "Word." The entry also specifies that the name of the voice command is "other trademark." The entry further specifies copying text block 220 to the clipboard and sending a "paste from clipboard" command to the active application, which the context preferably will limit to the word processing application. The entry further specifies that the command is described as "trademark notice for other trademarks." After step 904, the steps shown in FIG. 9 conclude.

Figure 7:
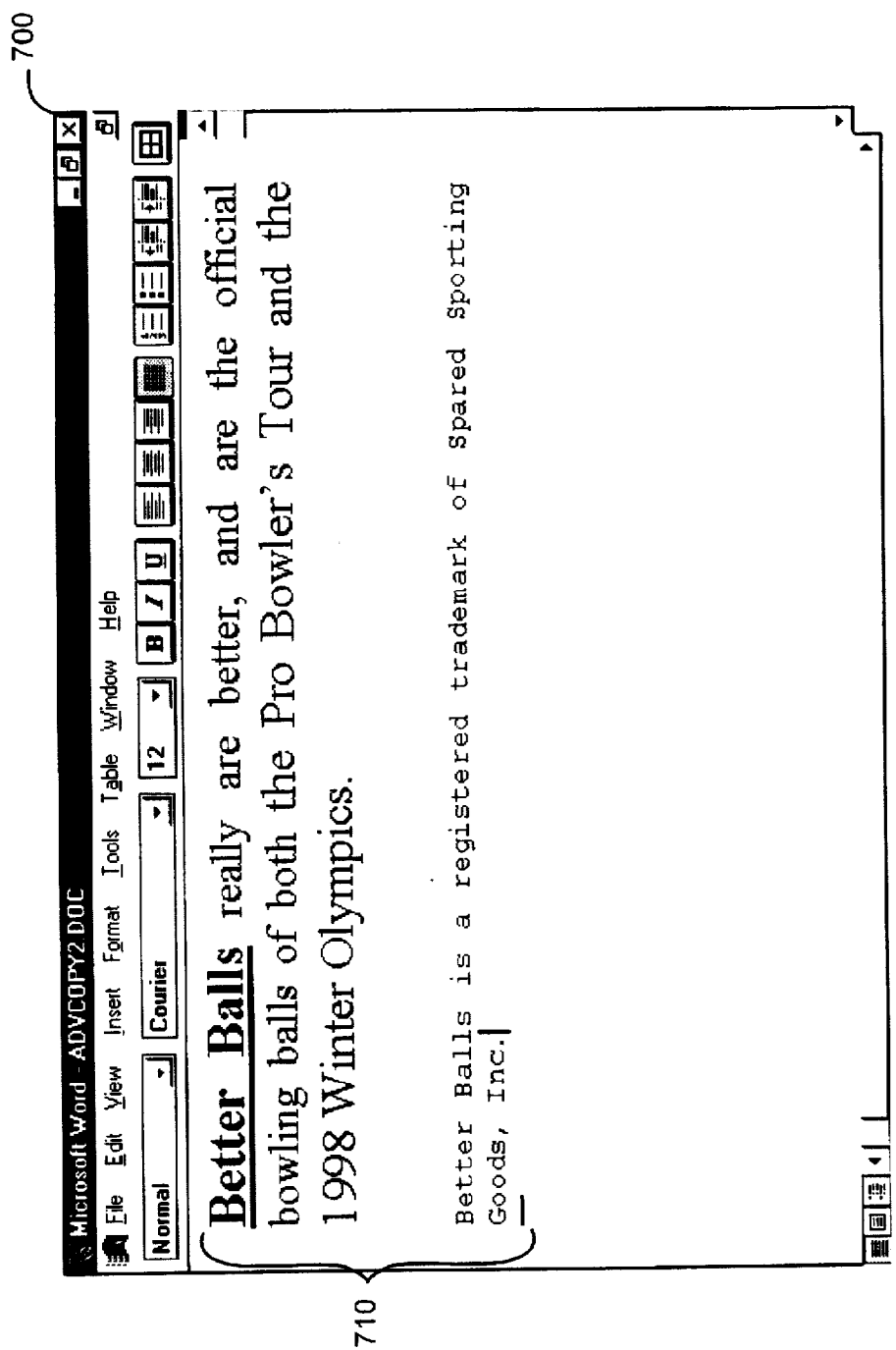
FIG. 7 is a screen diagram showing the user editing a second word processing document.

After the creation of the new voice command, it may be invoked by the user to insert the selected information in any other document. FIG. 7 is a screen diagram showing the user editing a second word processing document. The word processing application displays window 700, containing document contents 710. In order to insert the selected information of the voice command, ie., the text block containing the notes for other trademarks, the user preferably speaks the name of the voice command, "other trademarks." When the user speaks the name of the voice command, the facility compares the voice command to the names of the voice command entries in the voice command table 1032 (FIG. 10) that specify a currently active context. The facility preferably selects entry 1046 (FIG. 10), and executes its script in order to insert the text block in the document currently being edited.

Figure 8:
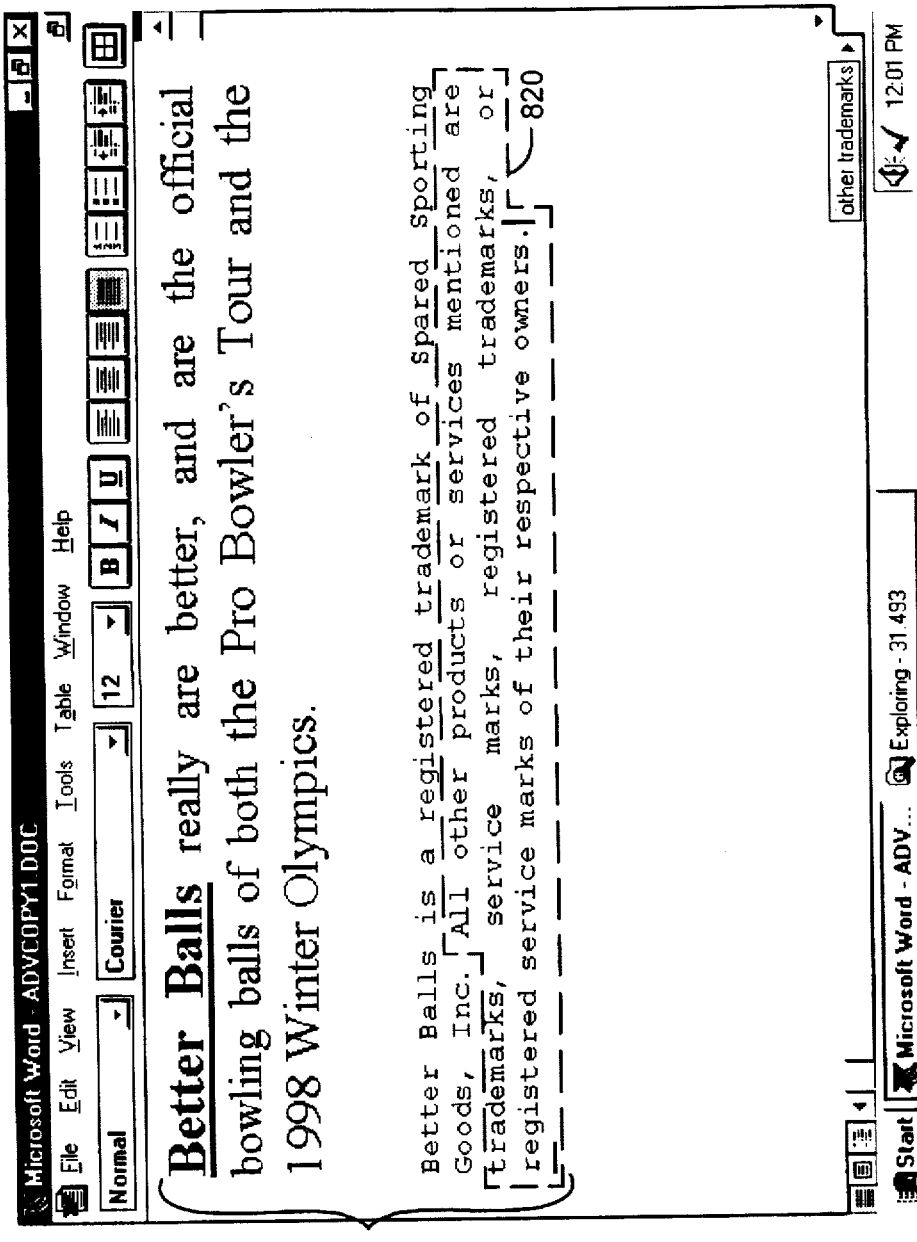
FIG. 8 is a screen diagram showing the contents of the second word processing document after the new voice command has been invoked.

FIG. 8 is a screen diagram showing the contents of the second word processing document after the new voice command has been invoked. The screen diagram shows that the text block 820 comprising the selected information of the new voice command has been inserted in the document contents 810.

While this invention has been shown and described with reference to preferred embodiments, it will be understood by those skilled in the art that various changes or modifications in form and detail may be made without departing from the scope of the invention.

We claim:

1. A method in a computer system for creating a new voice command for inserting selected information into a document, the method comprising the steps of:

receiving a command to create a new voice command after a user has selected information to be inserted by the new voice command;

in response to the step of receiving a command to create a new voice command:
retrieving the selected information, and
receiving from the user a new voice command name; and creating a voice command that, when invoked in response to receiving audio data corresponding to the new voice command name while a document is being edited, inserts the selected information into the document being edited.

2. The method of claim 1 wherein the computer system has a keyboard, and wherein the new voice command name received in the step of receiving from the user a new voice command name is received via the keyboard.

3. The method of claim 1 wherein the command to create a new voice command received in the step of receiving the command to create a new voice command is a voice command.

4. The method of claim 1 wherein the computer system includes a clipboard for transferring information between programs, and wherein a source document in which the information is selected is being edited by a source application program, and wherein the retrieving step includes the steps of:

directing to the source application an instruction to store the selected information on the clipboard; and retrieving the selected information from the clipboard for inclusion in the voice command created in the creating step.

5. The method of claim 1 wherein the computer system has a voice command table comprised of entries each identifying a voice command name that can be recognized when spoken by a user and a voice command script to be executed when the voice command name is recognized, and wherein the creating step includes the step of inserting an entry in the voice command table, the inserted entry identifying the new voice command name and a voice command script specifing insertion of the selected information in the document being edited.

6. The method of claim 1, further including the steps of:

receiving an indication that audio data corresponding to the new voice command name has been received while a destination document is being edited; and in response to receiving the indication, executing the created voice command to insert the selected information into the destination document.

7. The method of claim 6 wherein the computer system includes a clipboard for transferring information between programs, and wherein the destination document is being edited by a destination application program, and wherein the step of executing the created voice command includes the steps of:

copying the selected information to the clipboard; and after the copying step, directing to the destination application program an instruction to paste the contents of the clipboard into the destination document.

8. The method of claim 1 wherein the creating step creates a voice command that inserts all of the selected information into the document being edited.

9. In a computer system capable of displaying information, a method for creating a new voice command for inserting selected information into a document, the method comprising the steps of:

receiving an indication identifying displayed information that a user has selected;

receiving a command to create a new voice command from the selected information;

in response to the step of receiving a command to create a new voice command, receiving from the user a new voice command name; and creating a voice command that, when invoked by speaking the new voice command name while a document is being edited, inserts the selected information into the document being edited.

10. The method of claim 9 wherein the command to create a new voice command received in the step of receiving the command to create a new voice command is a voice command.

11. The method of claim 9, further including the steps of:

receiving an indication that audio data corresponding to the new voice command name has been received while a destination document is being edited; and in response to receiving the indication, executing the created voice command to insert the selected information into the destination document.

12. The method of claim 11 wherein the computer system includes a clipboard for transferring information between programs, and wherein the destination document is being edited by a destination application program, and wherein the step of executing the created voice command includes the steps of:

copying the selected information to the clipboard; and after the copying step, directing to the destination application program an instruction to paste the contents of the clipboard into the destination document.

13. The method of claim 9 wherein the computer system has a keyboard, and wherein the new voice command name received in the step of receiving from the user a new voice command name is received via the keyboard.

14. An apparatus for creating a new voice command for inserting selected information into a document, comprising:

a display device for displaying visual information;

a pointing device that may be used by a user to select information displayed on the display device;

a command receiver for receiving a command to create a new voice command;

a keyboard that may be used by the user to input a new voice command name;

a voice command table memory for containing a voice command table containing a plurality of voice command names, each voice command name having associated with it a script to be executed when the voice command name is recognized; and a new voice command creation system for storing the new voice command name inputted using the keyboard in the voice command table memory with a script specifying insertion of the information selected using the pointing device in a document being edited when the voice command is recognized in response to the use of the pointing device to select information, the operation of the command receiver to receive a command to create a new voice command, and the use of the keyboard to input a new voice command name.

15. The apparatus of claim 14 wherein the command receiver is a voice command recognition system.

16. The apparatus of claim 14, further including:

a voice command recognition system for receiving voice command input data form the user, matching the voice command input data to a voice command name stored in the voice command table memory, and executing the voice command script associated with the matched voice command name.

17. An instance of computer-readable storage media upon which is stored a voice command creation program capable of causing a computer system to, in response to selection of information, invocation of a voice command creation command, and specification of a voice command name by a user, create a voice command that specifies inserting the selected information into a document in response to receiving audio data corresponding to the voice command name.

18. A method in a computer system for creating a new voice command to provide to an application program information selected by a user, the method comprising the steps of:

in response to user input, selecting the information; and while the information is selected, in response to the user's invocation of a command for creating a new voice command, creating a voice command for providing the selected information to a selected application program when a selected utterance is spoken.

19. The method of claim 18 wherein the creating step creates a voice command that causes the application program to insert the selected information in a document.

20. The method of claim 19 wherein the creating step creates a voice command that inserts all of the selected information into the document being edited.

21. The method of claim 18, further comprising the step of:

in response to detecting that the user has spoken an utterance associated with the command for creating a new voice command, invoking the command for creating a new voice command.

22. A computer-readable medium whose contents cause a computer system to create a new voice command to convey to a program information selected by a user by performing the steps of:

in response to user input, selecting the information; and while the information is selected, in response to the user's invocation of a command for creating a new voice command, creating a voice command for conveying the selected information to a selected program when a selected utterance is spoken.

23. The computer-readable medium of claim 22 wherein the creating step creates a voice command that causes the selected program to insert the selected information in a document.

24. The computer-readable medium of claim 22, wherein the contents of the computer-readable medium further cause the computer system to perform the step of:

in response to detecting that the user has spoken an utterance associated with the command for creating a new voice command, invoking the command for creating a new voice command.

* * * * *